United States Patent
Wildey et al.

[19]

[11] Patent Number: 5,860,630
[45] Date of Patent: Jan. 19, 1999

[54] BEVERAGE CONTAINER HOLDER FOR A VEHICLE

[75] Inventors: Graham P. Wildey, Portland; Michael G. Pranger, Hillsboro; Rodger P. Garner, Portland, all of Oreg.

[73] Assignee: Freightliner Corporation, Portland, Oreg.

[21] Appl. No.: 645,612

[22] Filed: May 14, 1996

[51] Int. Cl.⁶ ....................................................... A47K 1/08
[52] U.S. Cl. ........................................... 248/311.2; 224/926
[58] Field of Search ................................ 248/311.2, 310, 248/312, 314, 315; 224/483, 282, 926; 297/188.16, 188.17

[56] References Cited

U.S. PATENT DOCUMENTS

| | | |
|---|---|---|
| 2,574,250 | 11/1951 | Dalton . |
| 2,649,270 | 8/1953 | Franks . |
| 2,772,934 | 12/1956 | Eraut . |
| 2,789,861 | 4/1957 | Hudson . |
| 2,883,234 | 4/1959 | Biondo . |
| 2,884,174 | 4/1959 | Davitt . |
| 2,904,299 | 9/1959 | Dalton . |
| 3,132,892 | 5/1964 | Stevens . |
| 3,233,858 | 2/1966 | Benjamin . |
| 3,386,765 | 6/1968 | Drach, Jr. . |
| 3,503,648 | 3/1970 | James . |
| 3,994,465 | 11/1976 | Rudnitzky . |
| 4,099,814 | 7/1978 | Hasselberger . |
| 4,434,961 | 3/1984 | Hoye . |
| 4,530,480 | 7/1985 | Pratt . |
| 4,568,117 | 2/1986 | McElfish et al. . |
| 4,583,707 | 4/1986 | Anderson . |
| 4,645,157 | 2/1987 | Parker . |
| 4,712,823 | 12/1987 | Mills et al. . |
| 4,728,018 | 3/1988 | Parker . |
| 4,733,908 | 3/1988 | Dykstra et al. . |
| 4,826,058 | 5/1989 | Nakayama . |
| 4,828,211 | 5/1989 | McConnell et al. . |
| 4,902,061 | 2/1990 | Plavetich et al. . |
| 4,907,775 | 3/1990 | Lorence et al. . |
| 4,943,111 | 7/1990 | VanderLaan . |
| 4,953,771 | 9/1990 | Fischer et al. . |
| 4,953,772 | 9/1990 | Phifer . |
| 4,955,571 | 9/1990 | Lorence et al. ................. 248/311.2 |
| 4,981,277 | 1/1991 | Elwelll . |
| 5,007,610 | 4/1991 | Christiansen et al. . |
| 5,018,633 | 5/1991 | Toth et al. . |
| 5,024,411 | 6/1991 | Elwell . |
| 5,024,441 | 6/1991 | Elwell .............................. 224/926 X |
| 5,060,899 | 10/1991 | Lorence et al. ................. 248/311.2 |
| 5,072,909 | 12/1991 | Huang . |
| 5,072,989 | 12/1991 | Spykerman et al. . |
| 5,087,008 | 2/1992 | Miller et al. . |

(List continued on next page.)

FOREIGN PATENT DOCUMENTS

405193405  8/1993  Japan ..................................... 224/483

*Primary Examiner*—Ramon O. Ramirez
*Assistant Examiner*—Long Dinh Phan
*Attorney, Agent, or Firm*—Klarquist Sparkman Campbell Leigh & Whinston, LLP

[57] ABSTRACT

A beverage container holder includes first and second beverage container receivers which may be stacked one above the other when stored and also are stacked when positioned in one configuration for use. The container receivers are pivoted about a common upright, most preferably vertical, axis. The upper container receiver includes a rim which defines an opening through which a beverage container may be inserted. The lower receiver defines a recess with a base. The lower receiver may be positioned beneath the upper receiver when in use, in which case the base limits the extent to which a container may be inserted through the rim. The lower receiver includes an upper portion of a first cross-sectional dimension and a lower portion of a smaller cross-sectional dimension, such as sized to receive a standard twelve ounce soda pop container. When in a non-stacked position, the upper receiver is capable of receiving a large beverage container without interference by the lower receiver. When the two receivers are in a stacked container receiving position, a beverage container is supported by the lower receiver.

23 Claims, 4 Drawing Sheets

U.S. PATENT DOCUMENTS

| | | |
|---|---|---|
| 5,096,152 | 3/1992 | Christiansen et al. . |
| 5,104,184 | 4/1992 | Kwasnik et al. . |
| 5,104,185 | 4/1992 | Kwasnik et al. . |
| 5,104,186 | 4/1992 | Kwasnik et al. . |
| 5,104,187 | 4/1992 | Kwasnik et al. . |
| 5,131,716 | 7/1992 | Kwasnik et al. . |
| 5,139,222 | 8/1992 | Koorey et al. . |
| 5,141,194 | 8/1992 | Burgess et al. . |
| 5,167,392 | 12/1992 | Henricksen . |
| 5,180,088 | 1/1993 | de Angeli . |
| 5,190,259 | 3/1993 | Okazaki . |
| 5,191,679 | 3/1993 | Harper . |
| 5,195,711 | 3/1993 | Miller et al. . |
| 5,219,140 | 6/1993 | Spykerman . |
| 5,238,211 | 8/1993 | Borovski . |
| 5,248,183 | 9/1993 | Gignac et al. . |
| 5,259,579 | 11/1993 | Schneider . |
| 5,259,580 | 11/1993 | Anderson et al. . |
| 5,280,848 | 1/1994 | Moore . |
| 5,284,314 | 2/1994 | Misaras et al. . |
| 5,289,962 | 3/1994 | Tull et al. . |
| 5,297,709 | 3/1994 | Dykstra et al. ...................... 224/282 X |
| 5,297,767 | 3/1994 | Miller et al. ......................... 248/311.2 |
| 5,318,266 | 6/1994 | Liu . |
| 5,330,146 | 7/1994 | Spykerman ......................... 224/926 X |
| 5,342,009 | 8/1994 | Lehner . |
| 5,379,978 | 1/1995 | Patel et al. . |
| 5,423,508 | 6/1995 | Isenga et al. . |
| 5,487,519 | 1/1996 | Grabowski . |
| 5,489,054 | 2/1996 | Schiff ...................................... 224/281 |

BEVERAGE CONTAINER HOLDER FOR A VEHICLE

BACKGROUND OF THE INVENTION

The present invention relates to beverage container holders for vehicles.

As a matter of convenience, vehicles are commonly equipped with beverage container holders within which a cup or a glass or the like may be positioned to reduce the risk of the container overturning as the vehicle is driven.

One such prior art beverage container holder is disclosed in U.S. Pat. No. 5,060,899 to Lorence et al. The Lorence device is understood to be actuated by actuating a push-to-release catch. Upon actuation, a pair of cup holders in Lorence move outwardly in a controlled manner from a housing. The cup holders overlap one another within the housing and may be maintained in the overlapping position. Alternatively, a release mechanism may be activated in Lorence to permit one cup holder to pivot about a vertical axis to a position away from the other cup holder, which does not pivot, so that both cup holders may support different containers. These cup holders are provided with a notch to accommodate a handle of a coffee cup and also include resilient projecting elements for engaging the sides of a beverage container positioned therein. Each of these cup holders has a bottom which limits the depth to which a cup may be inserted into the cup holder.

U.S. Pat. No. 5,330,146 to Spykerman is understood to disclose a pair of nested beverage container holders which, when slid axially out from the console or the like, may then be operated by relative pivoting of one of the container holders away from the other, to provide spaces for receiving two beverage containers. Like the Lorence et al. device, the Spykerman container holders have a floor that would limit the depth of insertion of a large beverage containing cup.

U.S. Pat. No. 4,955,571 to Lorence et al. is understood to disclose a pair of side-by-side beverage container holders which both slide out from and pivot relative to a housing which contains these holders when not in use.

U.S. Pat. No. 5,297,767 to Miller et al., is understood to disclose a pair of nested beverage container holders which slide axially outwardly from a console or the like when in use. That is, a first beverage container holder is slidably received within a second beverage container holder with the two nested beverage container holders being slidably received in the arm rest.

U.S. Pat. No. 5,489,054 to Schiff is understood to disclose an extendable tray for a vehicle with first and second beverage container holders which each pivot about a separate respective vertical axis into position for use when the carrier is slid from a stored position to use position.

Although a number of prior art beverage container holders exist for vehicles, a need exists for an improved beverage container holding apparatus.

SUMMARY OF THE INVENTION

In accordance with the present invention, a beverage container holder for a vehicle includes first and second beverage container receivers. The first beverage container receiver includes a rim which defines an upwardly facing container cup receiving opening when the first beverage container is in a container receiving position. In this position, a container such as a forty-four ounce beverage cup, may be inserted through the opening for engagement by the rim to securely hold the container in place. The second beverage container receiver defines an upwardly facing container receiving recess, and in the preferred embodiment is a cup-like structure. The recess has a base for limiting the depth to which a container may be inserted into the recess. The second beverage container is movable from a first position to a second position. When in the first position, the second beverage receiver is spaced from the first beverage container receiver so that it does not interfere with the insertion of a tall beverage container downwardly and through the opening defined by the rim. When moved to the second position, the second beverage container receiver has its recess positioned beneath the rim of the first beverage container receiver in a stacked orientation. In this case, a beverage container inserted through the opening defined by the rim rests on the base and is supported by the second beverage container receiver. In this manner, a variety of sizes of beverage containers may be securely held by the beverage container holder of the present invention.

As a more specific aspect of the present invention, the beverage container holder includes a support about which the first and second beverage container receivers may be pivoted for pivoting about an upright, and most preferably substantially vertical, pivot axis. In the specific illustrated embodiment, this support forms a part of an upright sidewall portion of a dash console. The console projects toward the space between the driver and passenger seats of the vehicle. The beverage container holder is positioned in the sidewall of the console at a location where it is readily reachable by an individual seated in a seat of the vehicle. Most specifically, in the illustrated embodiment the beverage container holder is easily reached by a person seated in the passenger seat of the vehicle. The sidewall portion may include a container holder receiving chamber into which the first and second beverage container receivers pivot when not in use.

In the illustrated embodiment of the present invention, the first and second beverage container receivers are selectively stacked. More specifically, the second beverage container receiver is stacked below the first when these beverage container receivers are positioned in the receiving chamber. In this embodiment, these two container receivers are also stacked when the second beverage container receiver is in the second position to receive a container inserted through the opening defined by the rim of the first beverage container receiver.

As yet another aspect of the present invention, the first beverage container receiver may include a door panel positioned to close the opening leading to the chamber within which the receivers are stored when not in use. This door panel projects downwardly below the rim and provides a pivot limiting stop for the second beverage container receiver.

As a more specific aspect of the present invention, the first beverage container receiver may also include a latch operable to selectively retain the first beverage container receiver in the container holder receiving chamber. In addition, the door panel retains the second beverage container receiver in place when stored within the chamber.

The first beverage container receiver may also include a cup handle accommodating void formed in the rim, in which case the rim does not form a complete enclosed shape.

As yet another more specific aspect of the present invention, the second beverage container receiver has a perimeter wall with an upper portion of a first cross-sectional dimension which is preferably circular and of a radius which is less than the radius of a circular opening defined by the rim. This perimeter wall bounds at least a portion, and most preferably the entire perimeter, of the beverage container recess. In addition, the second beverage container receiver preferably defines a lower pocket below the upper portion which has a cross-sectional dimension which is reduced from the first cross-sectional dimension. This pocket may be defined by plural spaced-apart ribs extending radially inwardly from the perimeter wall.

The present invention relates to the above features individually and to unique combinations of the above features as set forth in the claims for the present invention. These and other objects, features and advantages of the present invention will become more fully apparent from the description and drawings that follow.

DETAILED DESCRIPTION OF A PREFERRED EMBODIMENT

Figure 1:
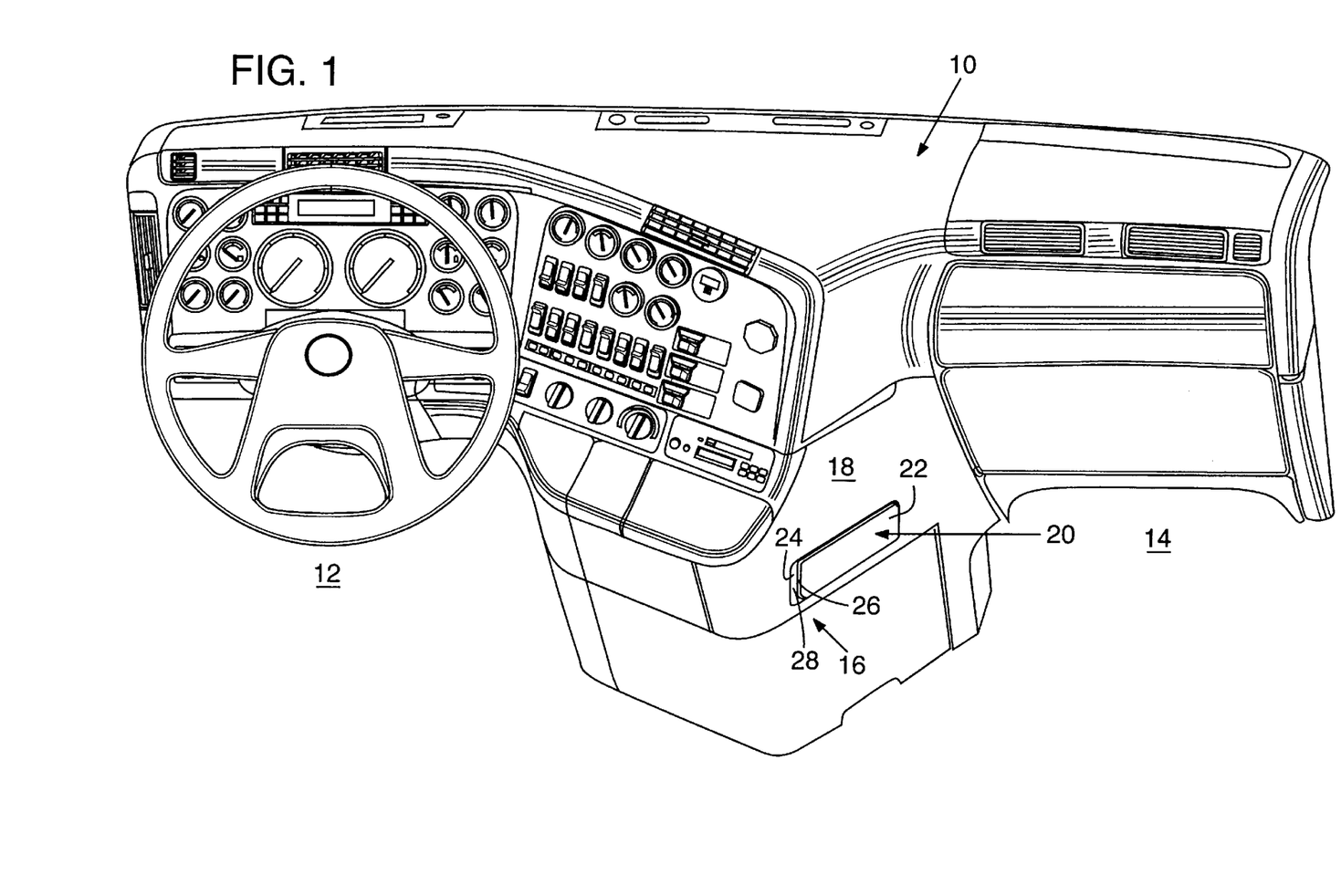
FIG. 1 is a perspective view of a vehicle dash console including a beverage container holder in accordance with one embodiment of the present invention.

With reference to FIG. 1, a vehicle dash 10 is shown having a driver's side 12 and a passenger side 14. A projecting console portion 16 of the dash extends rearwardly from the windshield area of the vehicle and toward the space between driver and passenger seats (not shown). The projecting portion of the console includes an upright wall section 18 within which a beverage container holder 20 in accordance with the present invention is stored when not in use. In FIG. 1, a beverage container holder 20 is shown recessed into a pocket or chamber 30 (the chamber being shown in FIG. 2). A door panel 22 is positioned in a flush orientation relative to the exterior surface of sidewall 18 and closes the opening leading to the chamber within which the beverage container holder is stored. A void 24 is provided between an edge 26 of the door and a wall portion 28 bounding the opening leading to the chamber. The space or void 24 accommodates a user's finger reaching into this opening to actuate or pull out the beverage container holder for use. Although a handle or other actuating mechanism may be used, this approach is simple and convenient.

Figure 2:
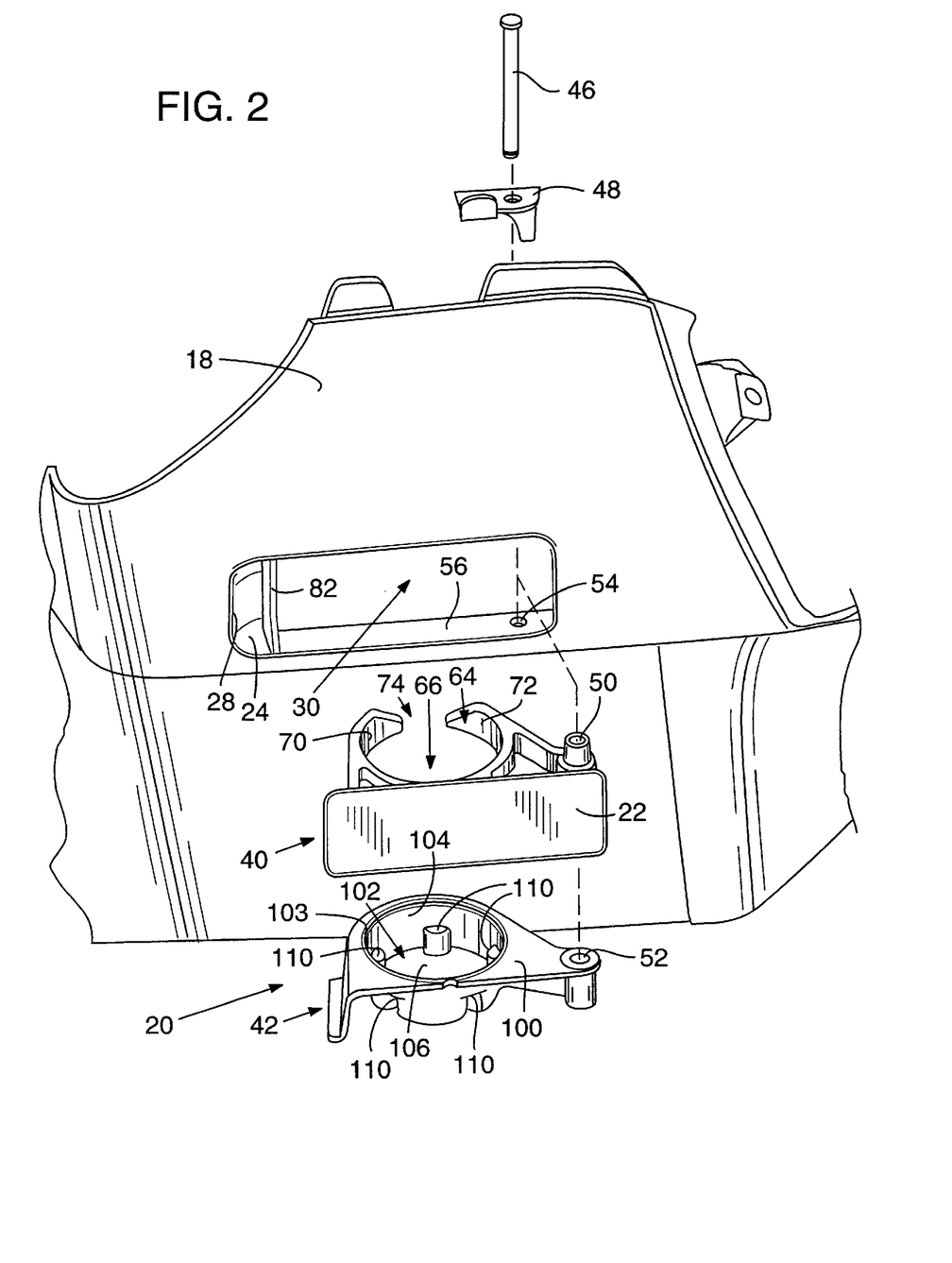
FIG. 2 is an exploded view of the beverage container holder of FIG. 1 and also shows a portion of the console wall within which the beverage container holder is stored when not in use.

The beverage container holder receiving chamber or pocket 30 defined within the sidewall 18 is shown in greater detail in FIG. 2. As also shown in FIG. 2, the illustrated beverage container holder preferably includes first and second beverage container receivers 40, 42. Although they may be made of any suitable durable material, a specifically suitable material for receivers 40, 42, as well as for the side wall 18, is Lustran 446 ABS plastic, from Monsanto Corporation. The receivers 40, 42 may be made by any convenient process, such as by injection molding.

When assembled, the first and second beverage container receivers 40, 42 in the illustrated embodiment are stacked one above the other when in a stored position in the pocket 30. More specifically, these beverage container receivers most preferably pivot about a common upright, and most preferably vertical pivot axis, defined by a pivot pin 46. Pin 46 extends through a bracket 48, mounted to the rear wall surface of the wall section 18 and above the opening 30, through a pivot pin receiving opening 50 of the upper beverage container receiver 40 and through a similar opening 52 of the lower beverage container receiver 42. The lower end of the pin 46 is inserted into an opening 54 in an inwardly projecting flange 56 bounding a portion of the lower edge of the wall chamber 30. The illustrated beverage container receivers 40, 42 thus pivot about an upright and preferably vertical pivot axis. In the embodiment of FIG. 2, this axis is located at the right side of the chamber 30 and thus is closer to the windshield (see FIG. 1). Therefore, when pivoted free of opening 30, the door 22 moves outwardly from the rear wall 18 to expose the beverage container receivers. It should be noted that the receivers 40, 42 may be pivoted about separate pivot axes and positioned in separate compartments when stored. In this case, their geometries would preferably be such that when in at least one position the receivers 40, 42 would be stacked above one another. Also, although less preferred, the receivers 40, 42 may be slidably or otherwise coupled to the wall to be shiftable to the beverage container receiving positions.

Figure 3:
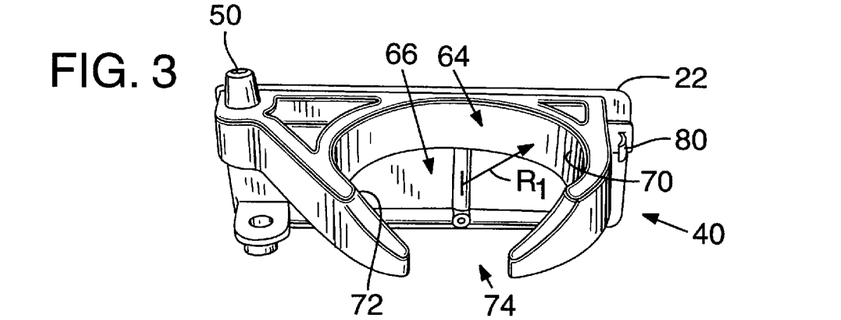
FIG. 3 is a perspective view of one form of upper beverage container receiver of FIG. 2.

The upper beverage container receiver 40 includes a rim 64 which bounds a beverage container receiver opening 66 which is upwardly facing. The rim substantially encloses the entire perimeter of opening 66 and may completely enclose this opening, which may be a circular opening. The opening 66 may have a radius $R_1$ of a first dimension such as about 46 mm. The height of the rim is variable, with 23 mm. being a specific example. In illustrated form, the rim is formed by first and second arcuate arm sections 70, 72 which terminate short of one another so that the opening 66 is not entirely enclosed. As a result, a cup handle receiving notch or void 74 is defined between the ends of the respective arm sections 70, 72. Although not critical, in the illustrated embodiment, void 74 extends through an arc of approximately twenty degrees to forty degrees, most preferably about thirty degrees. Because the rim 64 is open at its bottom or base, a large, tapered beverage container, such as a forty-four ounce soda pop container, may be inserted downwardly through opening 66 until the rim 64 engages a side wall of the soda pop container, thereby stably holding the container in position. This assumes that the lower beverage container holder 42 is in a position where it does not act as a stop and interfere with the insertion of the cup.

Figure 4:
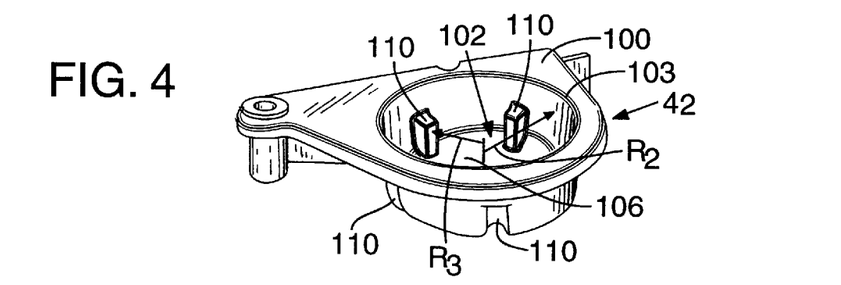
FIG. 4 is a perspective view of a lower beverage container receiver of FIG. 2.
Figure 5:
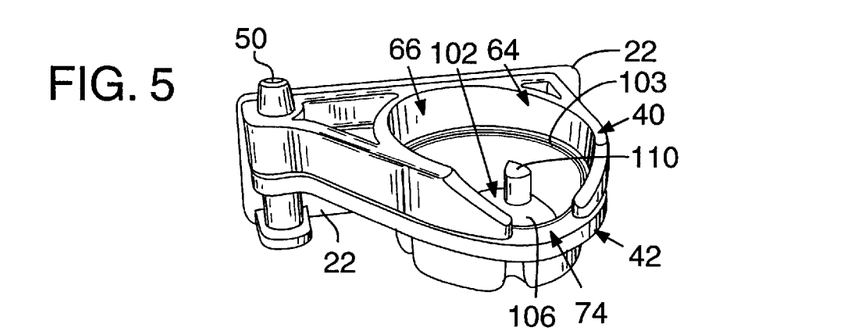
FIG. 5 is a perspective view illustrating the upper and lower beverage container receivers in a stacked position.

With reference to FIGS. 2 and 4, the lower beverage container receiver 42 includes a shelf portion 100 within which a cup-like recess 102 is formed. The recess is bounded by a perimeter wall 104 which may extend substantially around the entire perimeter of the recess 102. Although not required, in the form illustrated in FIG. 2, wall 104 entirely encloses the perimeter. With the perimeter enclosed by wall 104 and sealed to the base 106, the recess 102 is enclosed and captures spills. In addition, the bottom of recess 102 is bounded by a base 106, which limits the depth to which a beverage container may be inserted into the recess 102. Although variable, in one example the depth of the recess 102 is about 38 mm. from base 106 to shelf 100. The cross-sectional dimension of the recess 102, at least the upper portion of the recess, is preferably smaller than the cross-sectional dimension of the rim 64. That is, for a circular recess 102, the radius $R_2$ of the upper portion of the recess may be about 44 mm. Thus, when stacked as shown in FIG. 5, a ledge 103 is provided at the intersection of receiver 40 and receiver 42. This ledge is preferably champferred and assists in guiding a cup or other container into the recess 102.

In addition, the beverage container receiver 42 defines a lower pocket of a cross-sectional dimension which is reduced in comparison to the cross-sectional dimension of the upper portion of the container receiver 42. In the illustrated form, a plurality of ribs 110 (five such ribs being shown in FIG. 2) project radially inwardly from the wall 104 and upwardly from base 106 to define a pocket of reduced dimension therebetween at the lower or base portion of the recess 102. The ribs 110 extend upwardly a portion of the way from base 106 toward shelf 100, for example, about 20 mm. The upper edges of the ribs define a container resting surface for supporting a coffee cup or other beverage container. The inner surfaces of the ribs are preferably positioned along a circle so as to define a circular lower pocket. This lower pocket is preferably sized to receive a standard twelve ounce soda pop can. For example, the pocket may have a radius $R_3$ of about 33 mm.

As shown in FIG. 3, the rear side of door 22 includes a snap latch 80 which engages a catch when the beverage container holder is in the stored position to hold the mechanism in place within chamber 30 (FIG. 2). The latch mechanism may take any convenient form and is optional, although it does assist in reducing possible rattling of the beverage container holder and in maintaining the door closed during vehicle operation.

With reference to FIG. 5, the upper and lower beverage container receivers 40, 42 are shown in the stacked position which they may assume when stored in the pocket 30 of wall 18 (FIG. 2) and also the position which they may assume when they are both pivoted outwardly from the pocket to a use position. In the illustrated embodiment, the receivers 40, 42 are pivotable through about ninety degrees. By configuring the side wall to allow these receivers to pivot through a larger arc, for example one hundred eighty degrees, the receivers 40, 42 may each be shifted to a beverage container receiving position outside the pocket 30 so that two beverage containers may be simultaneously held. When in this orientation, the base 106 of the container receiver 42 and upper ends of ribs 110 limit the extent to which a beverage container may be inserted downwardly through the opening 66 defined by rim 64. Thus, for example, a coffee cup may be inserted through opening 66 and rest on base 106 with the handle of the cup, if any, extending through the handle accommodating void 74 in rim 64. In addition, if the coffee cup is of greater cross-sectional dimension than the dimension between the ribs 110 and of a lesser cross-sectional dimension than the upper portion of the recess 102 (i.e. has a radius of less than $R_2$), the cup simply rests on top of the upper end of the ribs with the rim 64 helping to hold the cup in place. In addition, a standard twelve ounce soda pop can may be inserted through opening 66 and be securely held between the ribs 110. In this manner, when the holder is in the use position shown in FIG. 5, a variety of cups may be held in the holder.

Figure 6:
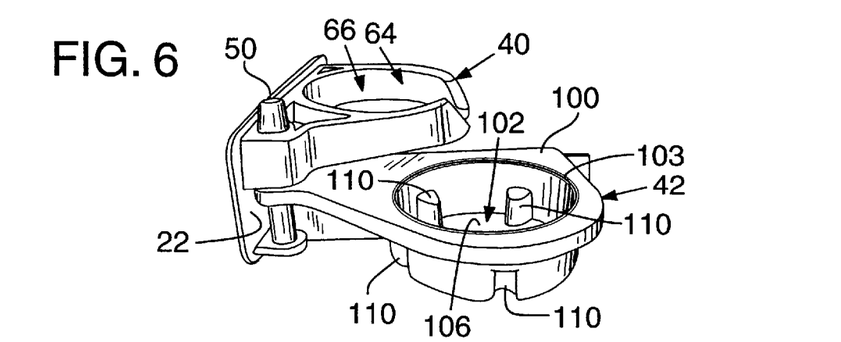
FIG. 6 is a perspective view of the upper and lower beverage container receivers in a separated or pivoted-apart position such that a cup may be inserted in the upper beverage container receiver without interference by the lower beverage container receiver.

For holding larger cups, the beverage container holder is most preferably configured in the use position shown in FIG. 6. In this position, the lower beverage container 42 is pivoted out of the way of the upper beverage container receiver 40. As a result, a large beverage container may be inserted through the opening 66 defined by rim 64 downwardly until the rim engages the side wall of the beverage container. The shelf 100 as well as the remaining portion of the beverage container receiver 42 are in this case positioned away from opening 66, that is out of alignment with opening 66. As a result, the lower receiver 42 does not interfere with the insertion of these large beverage containers. Consequently, the lower portion of the beverage cup or other container may extend below the receiver 42. The rim 64 thus engages the beverage container and stably holds it in position. When positioned in the orientation shown in FIG. 6, the beverage container receiver 42 is typically located within the pocket 30 defined within side wall 18. In other words, the upper beverage container receiver 40 may be pivoted free of the chamber 30 independently of the lower beverage container receiver 42.

As also can be seen in FIG. 5, the door 22 projects downwardly below the rim 64 and thus overlies the beverage container receiver 42 when in the position shown in FIG. 5. Also, the door 22 prevents the lower beverage container receiver 42 from pivoting outwardly beyond the upper container receiver 40 and thus establishes the stacked position of 40, 42 when desired to be used as illustrated and described in connection with FIG. 5.

Figure 7:
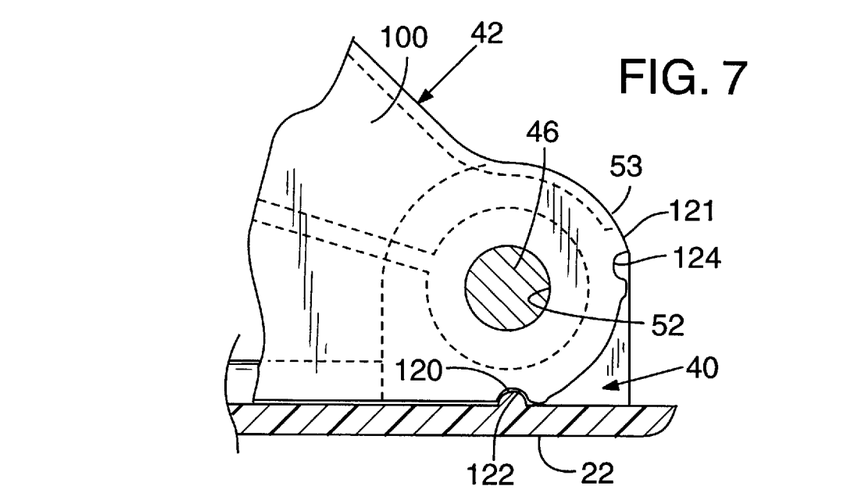
FIGS. 7 and 8 are partially broken away cross-sectional views of a catch mechanism which limits the relative pivoting of the upper and lower beverage container receivers.
Figure 8:
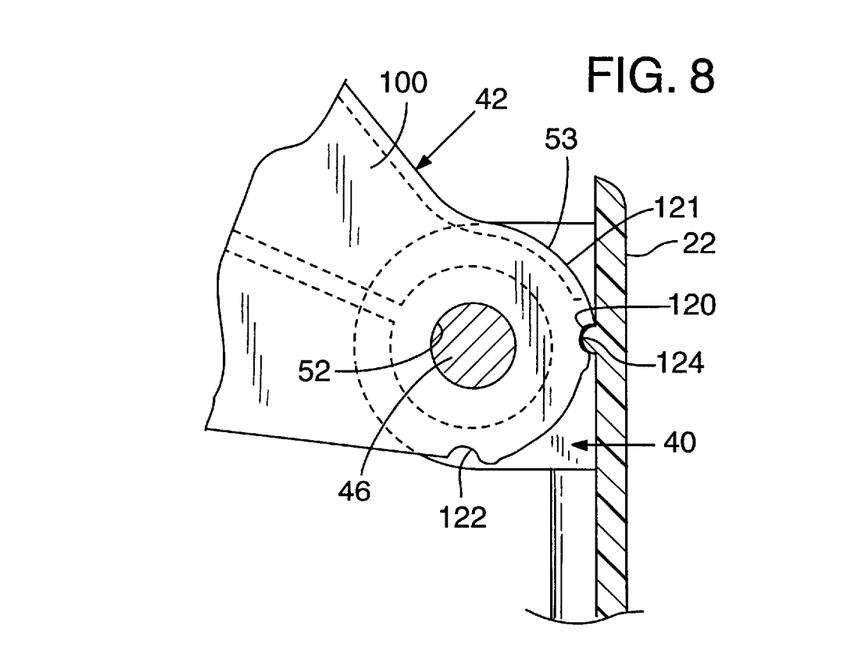

Referring to FIGS. 7 and 8, the portion 53 of receiver 42 which bounds pin receiving opening 52 has a perimeter 121 which defines first and second optional detent receiving recesses 122, 124 spaced about ninety degrees apart along the perimeter 121. The back surface of door 22 includes an optional projecting detent 120. When receivers 40, 42 are stacked, as shown in FIG. 7, detent 120 is positioned within recess 122 to assist in retaining receivers 40, 42 in this stacked position. Conversely, when receivers 40, 42 are pivoted apart as shown in FIG. 6, detent 120 is positioned in recess 124 to assist in holding receivers 40, 42 in their spaced positions.

Thus, a beverage container receiver in accordance with the present invention is mechanically simple, yet versatile in that it is capable of securely holding a wide variety of beverage containers in a position which is convenient for use by an individual in the vehicle, such as someone occupying the passenger seat of the vehicle. Of course, the invention may be modified in detail from that previously described. Also, one or more such holders may be positioned at locations in a vehicle for use by others besides an individual seated in the passenger seat of the vehicle, although this latter location is the most preferred location.

Having illustrated and described the principles of our invention with reference to a preferred embodiment, it should be apparent to those of ordinary skill in the art that the invention may be modified in arrangement and detail without departing from such principles. We claim all such modifications which fall within the scope of the following claims.

We claim:

1. The beverage container holder for holding at least one container a vehicle comprising:

a support first and second beverage container receivers;

the first beverage container receiver pivoted to the support and including a rim which defines an upwardly facing container cup receiving opening when the first beverage container is pivoted to a container receiving position, the rim being sized and shaped for permitting the container to be inserted downwardly through the container receiving opening and into engagement by the rim to hold the container with the lower portion of the container being positioned below the first beverage container receiver;

the second beverage container receiver to the support and defining an upwardly facing container receiving recess, the recess having a base, the second beverage container being selectively movable from a first position to a second position, when in the first position the second beverage container receiver is spaced from the container receiving opening and thereby does not interfere with the insertion of a tall beverage container into the container receiving opening, when in the second position, the container receiving recess of the second beverage container is positioned beneath the container receiving opening of the first beverage container receiver to thereby support a beverage container on the base when the beverage container is inserted through the opening in the rim and into the beverage container recess.

2. The beverage container receiver according to claim 1 in which the first beverage container receiver is an open bottom rim which includes a cup handle accommodating void in the rim.

3. The beverage container receiver according to claim 1 in which the second beverage container receiver has a perimeter wall with a cross-sectional dimension which is larger than the diameter of a standard twelve ounce soda pop can and bounds at least an upper portion of the beverage container recess so as to define a first beverage container receiving region at the upper portion of the beverage container recess for beverage containers of a first size, the second beverage container receiver including plural ribs extending inwardly from the wall and defining a soda pop can receiving pocket between the ribs at a lower portion of the beverage container recess so as to define a second beverage container receiving region at the lower portion of the beverage container recess for beverage containers of a second size which is smaller than the first size.

4. The beverage container holder for a vehicle comprising:

first and second beverage container receivers;

the first beverage container receiver including a rim which defines an upwardly facing container cup receiving opening when the first beverage container is in a container receiving position, whereby a container may be inserted the container receiving opening and engaged by the rim to hold the container;

the second beverage container receiver defining an upwardly facing container receiving recess, the recess having a base, the second beverage container being selectively movable from a first position to a second position, when in the first position the second beverage container receiver is spaced from the container receiving opening and thereby does not interfere with the insertion of a tall beverage container into the container receiving opening, when in the second position, the container receiving recess of the second beverage container is positioned relative to the container receiving opening of the first beverage container receiver to thereby support a beverage container on the base when the beverage container is inserted through the opening in the rim and into the beverage container recess; and including a support, the first and second beverage container receivers being pivoted to the support for pivoting movement about a common upright pivot axis with the second beverage container receiving recess being movable about the common pivot axis between the first and second positions.

5. The beverage container holder according to claim 4 in which the support includes a container holder receiving chamber into which the first and second beverage container receivers pivot about the common axis when not in use.

6. The beverage container holder according to claim 5 in which the first and second beverage container receivers are stacked, with the first beverage container receiver being above the second beverage container receiver, when positioned in the container holder receiving chamber and are also stacked when the second beverage container receiver is in the second position.

7. The beverage container holder according to claim 5 wherein the first beverage container receiver includes a door panel which closes the container holder receiving opening when the first and second beverage container receivers are positioned in the container holder receiving chamber.

8. The beverage container holder according to claim 7 in which the door panel projects downwardly below the rim and engages the second beverage container receiver to limit the pivoting movement of the second beverage container receiver from first toward the second positions.

9. The beverage container receiver according to claim 5 in which the first beverage container receiver includes a latch operable to selectively retain the first beverage container receiver in the container holder receiving chamber.

10. A beverage container holder for a vehicle comprising:

first and second beverage container receivers;

a support;

the first and second beverage container receivers each being pivoted to the support and independently pivotable about a common vertical axis;

the first beverage container receiver being pivotable from a first stored position in which the first beverage container receiver is stacked above the second beverage container receiver to a second beverage container receiving position, the first beverage container receiver having an open bottom and a container engaging rim bounding at least a substantial portion of the open bottom, whereby a beverage container may be supported by the rim with the lower portion of the container projecting downwardly through the open bottom; and the second beverage container receiver also being pivotable from the first stored position to the second position such that when the first and second beverage container receivers are in the second position the first beverage container receiver is positioned above the second beverage container receiver, the second beverage container receiver including a base, whereby the base limits the extent to which a beverage container is insertable through the open bottom of the first beverage container receiver and supports such beverage container.

11. The beverage container holder according to claim 10 in which the support includes a container holder receiving chamber into which the first and second beverage container receivers pivot about the common axis when not in use.

12. The beverage container holder according to claim 11 wherein the first beverage container receiver includes a door which closes the container holder receiving opening when the first and second beverage container receivers are in the container holder receiving chamber.

13. The beverage container holder according to claim 12 in which the door projects downwardly below the rim of the first beverage container receiver and engages the second beverage container receiver to limit the degree of pivoting movement of the second beverage container receiver toward the second position.

14. The beverage container receiver according to claim 13 in which the first beverage container receiver includes a latch operable to selectively retain the first beverage container receiver, in the container holder receiving chamber with the door also retaining the second container receiver in the container holder receiving chamber.

15. The beverage container receiver according to claim 10 in which the first beverage container receiver includes a cup handle accommodating void in the rim.

16. The beverage container receiver according to claim 10 in which the second beverage container receiver has a perimeter wall of a first diameter which bounds at least an upper portion of the beverage container recess and defines an upper beverage container receiving region of a first cross-sectional size, the second beverage container receiver also including beverage container receiving pocket in the base of a second diameter which is less than the first diameter to define a lower beverage container receiving region of a second size which is less than the first size.

17. In a vehicle having a dash with a console portion projecting toward the space between driver and passenger seats of the vehicle, a beverage container holder assembly comprising:

an upright sidewall portion of the dash console facing the passenger seat of the vehicle;

a beverage container holder chamber defined in the sidewall portion;

first and second beverage container receivers each being pivoted to the sidewall portion for pivoting movement about a common vertical axis;

the first beverage container receiver being pivotable from a first stored position in which the first beverage container receiver is stacked above the second beverage container receiver to a second beverage container receiving position, the first beverage container receiver having an open bottom and a container engaging rim bounding at least a substantial portion of the open bottom, whereby a container may be supported by the rim with the lower portion of the container projecting downwardly through the open bottom; and the second beverage container receiver also being pivotable from the first stored position to the second position such that when the first and second beverage container receivers are in the second position the first beverage container receiver is positioned above the second beverage container receiver, the second beverage container receiver including a base which limits the extent to which a beverage container is insertable through the open bottom and which supports such an inserted beverage container.

18. The beverage container holder assembly according to claim 17 wherein the first beverage container receiver includes a door which closes the container holder receiving opening when the first and second beverage container receivers are in the container holder receiving chamber and in which the door projects downwardly below the lower surface of the first beverage container receiver and engages the second beverage container receiver to restrict the degree of pivoting movement of the second beverage container receiver when moving toward the second position.

19. The beverage container holder assembly according to claim 18 in which the first beverage container receiver includes a latch operable to selectively retain the first beverage container receiver in the container holder receiving chamber and also with the door retaining the second beverage container receiver in the container holder receiving chamber.

20. The beverage container holder assembly according to claim 19 in which the first beverage container receiver includes a cup handle accommodating void in the rim and in which the second beverage container receiver has a perimeter wall of a first diameter which is larger than the diameter of a standard twelve ounce soda pop can and bounds at least an upper portion of the beverage container recess, the second beverage container receiver including plural ribs extending inwardly from the wall along only a lower portion of the wall and defining a soda pop can receiving pocket between the ribs.

21. The beverage container holder for a vehicle comprising first and second beverage container receivers, the first beverage container receiver having an open bottom and a first beverage container receiving opening of a first cross-sectional dimension, the second beverage container receiver having a second beverage container receiving opening of a second cross-sectional dimension which is smaller than the first cross-sectional dimension, the beverage container receivers being shiftable to at least one position wherein the second beverage container receiver is positioned as a stop to limit the depth to which a beverage container is inserted through the first beverage container receiving opening and shiftable to at least one position wherein the second beverage container receiver does not stop or limit the depth of insertion of a beverage container through the first beverage container receiving opening and through the bottom of the first beverage container receiver.

22. The beverage container holder according to claim 21 in which the first beverage container receiver comprises a rim which defines the first beverage container receiving opening.

23. The beverage container holder according to claim 22 wherein the second beverage container receiver defines an enclosed beverage container holder receiving recess, the second beverage container receiving opening being provided at an upper end of the beverage container holder receiving recess.

* * * * *

UNITED STATES PATENT AND TRADEMARK OFFICE
CERTIFICATE OF CORRECTION

PATENT NO.        : 5,860,630

DATED             : January 19, 1999

INVENTOR(S)       : Wildey et al.

It is certified that error appears in the above-identified patent and that said Letters Patent is hereby corrected as shown below:

| Col./Line | | Should Read |
|---|---|---|
| 7/7 | receiver to the support | receiver coupled to the support |

Signed and Sealed this

Twenty-seventh Day of March, 2001

Attest:

NICHOLAS P. GODICI

Attesting Officer     Acting Director of the United States Patent and Trademark Office